United States Patent Office 2,829,139
Patented Apr. 1, 1958

2,829,139

METALLIFEROUS AZO DYESTUFF

Albert F. Strobel, Phillipsburg, N. J., and William W. Williams, Easton, Pa., assignors to General Aniline & Film Corporation, New York, N. Y., a corporation of Delaware No Drawing. Application October 30, 1953
Serial No. 389,456

4 Claims. (Cl. 260—147)

This invention relates to the production of a novel metalliferous complex compound of an azo dyestuff having the formula:

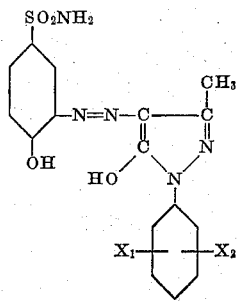

wherein $X_1$ and $X_2$ are selected from the group consisting of H, halogen, lower alkyl and lower oxyalkyl.

Recently there has arisen a demand for dyestuffs for nylon and other synthetic fibers of extremely high light fastness, i. e., dyestuffs unaffected by 100 hours Fadeometer exposure. This property, essential in fabrics employed for examples in window curtains, automobile upholstery and seat covers, is particularly difficult to obtain when pastel shades are desired. In addition, it is highly desirable that such dyestuffs be of good wash fastness, and sufficiently soluble in water to dye the nylon or other fibers with good exhaust from a neutral aqueous bath. While many dyestuffs have been employed for the above purposes, they are usually deficient in one or more of the desired properties.

It has been found that metalliferous complex compounds of the azo dyestuff above described possess the desired properties and may be employed to dye nylon and other fibers from a neutral aqueous bath with good exhaust to produce dyed fibers of exceptional good light fastness and good wash fastness.

The unmetallized azo dyestuff precursor of this invention may be formed in known manner by diazotization of 2-amino-phenol-4-sulfonamide followed by coupling the diazo compound with a 1-phenyl-3-methyl-5-pyrazolone.

The phenyl radical in the phenyl methyl pyrazolone coupling component may be substituted ($X_1$ and $X_2$ in the above formula) by such radicals as Cl, Br, $CH_3$, $C_2H_5$, $OCH_3$, $OC_2H_5$ and the like. By way of example, there may be mentioned as useful coupling components 1-phenyl - 3- methyl-5-pyrazolone, 1-(2'-chlorophenyl)-3-methyl-5-pyrazolone, 1 - (2',5'-dichlorophenyl)-3-methyl-5-pyrazolone, 1 - (2'-methyl phenyl)-3-methyl-5-pyrazolone, 1-(4'-methyl phenyl) - 3 - methyl-5-pyrazolone, 1 - (4' - methoxyphenyl)-3-methyl-5-pyrazolone, 1-(2'-chloro-5'-methoxy phenyl)-3-methyl-5-pyrazolone and the like.

This azo dyestuff precursor may then be treated with an agent yielding metal in known manner in acid, neutral or alkaline medium with or without the use of pressure and/or elevated temperatures. As substances yielding metal there may be used for example agents yielding copper, cobalt, nickel, and particularly chromium. These agents may be applied in the form of their oxides, hydroxides or salts, as for example, with inorganic or organic acids such as hydrochloric, sulfuric, hydrofluoric, formic, acetic, tartaric, salicylic, or the like. The metallizing agent may be used alone or in the presence of an additional substance which may or may not form a complex compound with the metallizing agent, as for example, ammonia, pyridine, ethylene diamine, ethanolamine, formic acid, acetic acid, oxalic acid, aliphatic and aromatic hydroxy-containing compounds such as alcohol, glycerin, aliphatic hydroxy carboxylic acids such as tartaric, lactic and citric acids and the like, aromatic hydroxy carboxylic acids such as salicylic acid and the like, sugars, cellulose derivatives, phenols, tannins and lignins, and the like, soluble salts of sulfonic acids and carboxylic acids of the aliphatic, aromatic and hydroaromatic series, inorganic metal, alkali-metal and alkaline earth metal salts, oxides and hydroxides and the like. Dispersing agents, solvents and other assistants may also be employed in the metallizing process.

The metallization may be conducted with one or several metallizing agents simultaneously or successively to yield mixed metalliferous complex azo compounds in accordance with this invention. The metallizing agent may be applied in such manner that the resulting complex compound of the azo dyestuff contains less than one atom, or one atom, or more than one atom of metal. Thus, the resulting metalliferous complex compound may represent the complex union of one atom of metal with one molecule of the azo dyestuff precursor or one atom of metal with two molecules of the azo dyestuff precursor.

The metalliferous complex azo compounds of this invention are soluble in water and produce excellent results when employed for dyeing nylon from a neutral aqueous bath. It will of course be understood, however, that the dyestuffs of this invention may be employed for dyeing other materials such as silk, wool, leather, mixed fibers, and the like. Polyacrylonitrile fibers may be dyed by the cuprous hydroxylamine method with the dyestuffs of this invention. They may also be employed for coloring natural or artificial resins and plastics in bulk, lacquers, and the like.

The following examples, in which parts are by weight unless otherwise indicated, are illustrative of the instant invention and are not to be regarded as limitative.

*Example 1*

5.45 grams of 2-amino phenol 4-sulfonamide (0.029 mole) were slurried with 65 ml. water and 5.0 ml. concentrated (37%) hydrochloric acid. The material was cooled to 5° C. by adding ice. 23.5 ml. of aqueous sodium nitrite (10% wt./vol.) were dripped in, and the material was stirred 15 minutes. The excess sodium nitrite was destroyed by the addition of 1.5 ml. of aqueous sulfamic acid (10% wt./vol.). A coupling solution was prepared by adding 30 ml. of water plus 3.0 ml. of aqueous sodium hydroxide (40% wt./vol.) to 5.54 grams of 1-phenyl-3-methyl-5-pyrazolone (0.0318 mole). The material was stirred until dissolved. It was then poured into the diazo solution. 5.0 ml. of concentrated aqueous ammonia were added, and after ½ hour of stirring the test for free diazo became negative. The material was filtered, and the presscake containing the azo dyestuff reslurried with 200 ml. water and 5.0 ml. concentrated (37%) hydrochloric acid, filtered again and the cake washed neutral with water. The azo dyestuff thus produced had the formula:

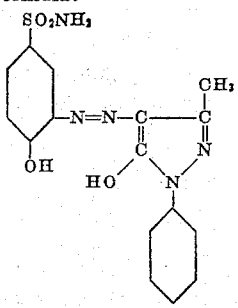

Example 2

The presscake of Example 1 containing 10.7 grams (0.029 mole) of unmetallized azo dye was slurried in 100 ml. formamide with 5.6 grams chromium formate paste (13.55% Cr, 0.0145 mole). The material was heated in a beaker on a steam bath until homogeneous, then poured into a 500 ml. beaker flask equipped with stirrer and thermometer. An additional 50 ml. of formamide were then used for rinsing. The material was heated at 95° C. and kept at this temperature for 6 hours. Then the temperature was raised to 135° C. and stirred at that temperature for 4 hours. The material was then cooled and poured into 250 ml. water. 100 grams sodium chloride were added to salt out the metallized product, a very soluble dye. The material was filtered and dried to obtain 12 grams dye, which were reslurried in 80 ml. alcohol and filtered. The filtrate was poured into 400 ml. of water. A precipitate occurred. The slurry was stirred 3 hours, then filtered. The presscake was dried at 80° C. in an air oven, yielding 6.8 grams of chromed dyestuff which contained by analysis one atom of chromium in complex union with two molecules of the azo precursor. Stated otherwise, the product was a chromiferous complex compound containing one-half atom of chromium for each o-, o'-dihydroxy-azo grouping in the dye molecule.

0.025 gram of the chromed dyestuff was dissolved in a beaker containing 300 ml. of water and heated to 200° F. There was then added 5.0 grams of nylon cloth and the material was stirred in the beaker at this temperature for 45 minutes, after which it was removed, rinsed, and dried. The cloth was dyed a red-orange shade of very good light fastness, and good wash fastness, with excellent exhaust from the dye bath. The product of this example had better exhaust and was less soluble than the dye produced in the following example.

Example 3

80.9 grams of the azo dye of Example 1 were added to a solution of 83.4 grams of chromium formate paste (containing 13.77% Cr, 0.217 mole) in 250 ml. formamide, heated to 140° C. and maintained at 140° C. for 6 hours, during which time the dye dissolved completely. The material was poured into 750 ml. water. To the solution was added 100 grams sodium chloride. The material precipitated, and was stirred 2 hours. It was filtered by suction and the cake was packed down, then air dried at 70° C. The dry chromed dye weighed 101.6 grams, and contained one atom of chromium for each o,o'-dihydroxy azo grouping in the azo dyestuff precursor molecule.

A 10.0 gram sample of nylon cloth was heated at 200° F. for ¾ hour with periodic stirring in 300 ml. of water containing 0.25 gram of the above chromed dye. At the end of this time the material was removed, rinsed with water, and dried. A level, yellowish-orange dyeing was obtained which was extremely fast to light, and very fast to washing.

Example 4

5.45 grams of 2-aminophenol-4-sulfonamide (0.029 mole) were slurried with 65 mls. of water and 5.0 mls. concentrated (37%) hydrochloric acid. The material was cooled to 5° C. by adding ice. 23.5 mls. of aqueous sodium nitrite (10% wt./vol.) were dripped in, and the material was stirred 15 minutes. The excess sodium nitrite was destroyed by the addition of 1.5 mls. of aqueous sulfamic acid (10% wt./vol.). A coupling solution was prepared by adding 30 mls. of water plus 3.0 mls. of aqueous sodium hydroxide (40 wt./vol.) to 7.75 grams of 1-(2',5' - dichlorophenyl) - 3 - methyl - 5 - pyrazolone (0.0318 mole). The material was stirred until dissolved. It was then poured into the diazo solution. 5.9 ml. concentrated aqueous ammonia were added, and after ½ hour of stirring the test for free diazo became negative. The material was filtered and the presscake containing the azo dyestuff was reslurried with 200 ml. water and 5.0 ml. concentrated (37%) hydrochloric acid, filtered again and the cake washed neutral with water. The azo dyestuff thus produced had the formula:

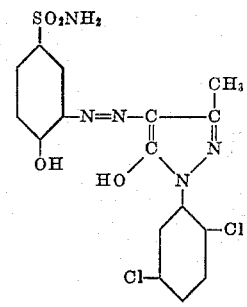

Example 5

The presscake from Example 4, representing 0.029 mole of dye, was slurried in 200 mls. water. Then 28 mls. of an aqueous solution representing 0.0152 mole of sodium chromium salicylate were added. The mixture was refluxed 5 hours and then cooled, filtered and dried. The chromed dyestuff contained one atom of chromium in complex union with two molecules of the azo precursor of Example 4.

0.025 gram of the chromed dye was dissolved in 300 mls. of water and heated to 200° F. There was then added 5.0 grams of nylon cloth and the material was worked in the beaker at this temperature for 45 minutes, after which it was removed, rinsed and dried. The cloth was dyed a red-orange shade of excellent light and wash fastness, brighter in shade than that of the dye of Example 2.

Various modifications and variations of this invention will be obvious to the person skilled in the art and it is to be understood that such modifications and variations are to be included within the purview of this application and the spirit and scope of the appended claims.

We claim:

1. A metalliferous compound containing a metal selected from the group consisting of chromium, copper, cobalt and nickel in complex union and with an azo dyestuff having the formula:

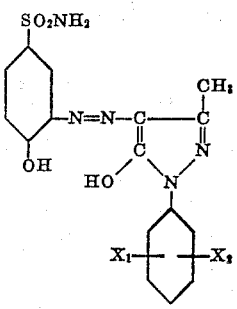

wherein $X_1$ and $X_2$ are selected from the group consisting of H, Cl and Br, at least one of $X_1$ and $X_2$ being one of said halogens.

2. A chromiferous compound containing chromium in complex union with the azo dyestuff having the formula:

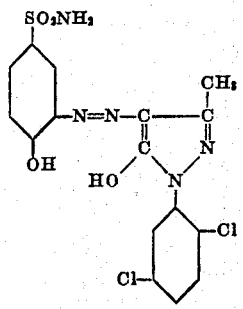

3. A compound as defined in claim 2 containing one-half of one atom of chromium for each molecule of the azo dyestuff.

4. A compound as defined in claim 2 containing one atom of chromium for each molecule of the azo dyestuff.

References Cited in the file of this patent
UNITED STATES PATENTS

| | | |
|---|---|---|
| 1,623,005 | Gubler et al. | Mar. 29, 1927 |
| 2,565,898 | Widmer et al. | Aug. 28, 1951 |
| 2,653,926 | Zickendraht et al. | Sept. 29, 1953 |
| 2,673,199 | Widmer et al. | Mar. 23, 1954 |
| 2,674,515 | Widmer et al. | Apr. 6, 1954 |